(12) United States Patent
Aitken et al.

(10) Patent No.: US 7,507,681 B2
(45) Date of Patent: Mar. 24, 2009

(54) GLASS-CERAMIC, ARTICLES AND FABRICATION PROCESS

(75) Inventors: Bruce Gardiner Aitken, Corning, NY (US); Lothar Wondraczek, Veneux-les-Sablons (FR)

(73) Assignee: Eurokera, Chierry, Chateau-Thierry (FR)

( * ) Notice: Subject to any disclaimer, the term of this patent is extended or adjusted under 35 U.S.C. 154(b) by 112 days.

(21) Appl. No.: 11/712,147

(22) Filed: Feb. 28, 2007

(65) Prior Publication Data

US 2008/0207424 A1    Aug. 28, 2008

(51) Int. Cl.
C03C 10/12    (2006.01)
C03C 10/14    (2006.01)

(52) U.S. Cl. .................. 501/4; 501/7; 65/33.1; 65/33.7; 65/33.9

(58) Field of Classification Search .......... 501/4, 501/5, 6, 7, 8, 9, 10; 65/33.1, 33.7, 33.9
See application file for complete search history.

(56) References Cited

U.S. PATENT DOCUMENTS

| | | | |
|---|---|---|---|
| 3,607,320 A | * | 9/1971 | Sakka ............ 501/10 |
| 3,816,161 A | * | 6/1974 | Buckley ............ 427/287 |
| 3,852,052 A | * | 12/1974 | Demarest, Jr. ............ 65/30.13 |
| 6,667,256 B2 | * | 12/2003 | Masuko ............ 501/32 |
| 6,698,244 B1 | | 3/2004 | Romer et al. |
| 6,893,728 B2 | * | 5/2005 | Oobuchi ............ 428/469 |

FOREIGN PATENT DOCUMENTS

| | | |
|---|---|---|
| DE | 101 30 894 A1 | 1/2003 |
| DE | 10 2004 024 022 A1 | 12/2005 |
| EP | 437228 B2 | 3/2002 |
| EP | 1 281 688 A1 | 2/2003 |
| EP | 1 516 863 A | 3/2005 |
| WO | WO2005066086 A2 | 7/2005 |

OTHER PUBLICATIONS

W. Hoeland, G. Beall Glass-ceramic Technology, American Ceramic Society Westerville (2002) pp. 88-96.

* cited by examiner

*Primary Examiner*—Karl E Group
(74) *Attorney, Agent, or Firm*—Michael W. Russell; Siwen Chen

(57) ABSTRACT

Bi-containing glass-ceramic material, especially those containing β-quartz and/or β-spodumene solid solutions as the predominant crystalline phase, and the precursor glass material as well as process of making such glass-ceramic material and articles. The glass-ceramic can be made to have a dark color, and essentially to be free of $V_2O_5$, $As_2O_3$ and $Sb_2O_3$.

27 Claims, 2 Drawing Sheets

GLASS-CERAMIC, ARTICLES AND FABRICATION PROCESS

FIELD OF THE INVENTION

The present invention relates to bismuth-containing glass, glass-ceramic materials, articles, and process of making such materials in general. In particular, certain embodiments of the present invention relate to glass-ceramic material having β-quartz and/or β-spodumene solid solution as the predominant crystalline phase, glass material useful as precursor glass thereof articles comprising the glass-ceramic material and processes of making such materials and articles. The present invention is useful, for example, in making glass-ceramic cooktop plates, windows for ovens and furnaces, and the like.

BACKGROUND OF THE INVENTION

Since their first discovery several decades ago, glass-ceramic materials have found extensive use due to many unique and desirable properties. For example, glass-ceramic materials comprising β-quartz and/or β-spodumene solid solution as the predominant crystalline phases have been used in stove windows, cooktop plates, kitchen utensils, food serving devices and receptacles, and the like, for many years.

Typically, the preparation of a glass-ceramic article comprises three steps: (i) melting the precursor glass for the glass-ceramic material, which typically contains a nucleating agent, and forming the glass into the shape of the article; (ii) treating the glass article at a temperature where crystal nuclei are allowed to form in the glass; and (iii) treating the glass article at a temperature where the crystallites of the desired phases are allowed to grow to a desired extent. Steps (ii) and (iii) are typically collectively called the process of ceramming. The color of the glass-ceramic article may remain the same as that of the precursor glass, or is altered slightly, or is changed drastically, after the ceramming process.

Dark colored glass-ceramic materials (for example, in dark brown, or near black color) having low transmission in the visible range and high transmission in the infrared are popular for cooktop plates. Such cooktop plates commercially available to date typically comprise $V_2O_5$ as the coloring agent for imparting the dark tint to the glass-ceramic plate. Without intending to be bound by a particular theory, it is believed that the species of vanadium in the glass undergo color-imparting chemical reactions with other species present in the glass when the precursor glass is cerammed, resulting in chemical species that are absorbing in the visible and transmissive in the infrared.

Vanadium has been found to be a potential health hazard when the body of a mammal is subject to high-dose exposure. Currently, $V_2O_5$ is used at a very low level in the dark glass-ceramic cooktop products. There is no evidence showing that such low level of $V_2O_5$ as currently used in these products, when the products are used as intended, may cause detrimental health effects to the human body. However, being free of $V_2O_5$ or containing $V_2O_5$ at an even lower level would be a welcoming feature for such products.

Many of the current cooktop products and other glass-ceramic products available in the market today also comprise small amounts of $As_2O_5$ and/or $Sb_2O_5$ as fining agent when the glass is made. These two are widely known toxic agents. Due to their detrimental effects on human bodies and the environment in some contexts, it is highly desired that they are not present in those products, or are used at a much lower level if possible.

Hence there is the need for glass-ceramic materials comprising less or no toxic agents such as $As_2O_5$, $Sb_2O_5$ and vanadium than in conventional glass-ceramic materials. Certain embodiments of the present invention satisfy this need.

SUMMARY OF THE INVENTION

According to a first aspect of the present invention, provided is a glass-ceramic material comprising bismuth as a coloring species in the visible range.

According to certain embodiments of the glass-ceramic material of the present invention, the material has a total transmission in the visible range, measured through a flat plate sample at a thickness of about 4 mm, of less than about 10%, in certain embodiments less than about 5%, in certain other embodiments less than about 3%, in certain other embodiments less than about 2%.

According to certain embodiments of the glass-ceramic material of the present invention, in addition to or in the absence of the transmission properties in the visible range specified above, the material has a transmission at about 2600 nm, measured through a flat plate sample at a thickness of about 4 mm, of higher than about 50%, in certain embodiments higher than about 75%, in certain other embodiments higher than 80%.

According to certain embodiments of the glass-ceramic material of the present invention, in addition to or in the absence of the transmission properties specified above, the glass-ceramic has a CTE from $-10\times10^{-7}/K$ to $25\times10^{-7}/K$, in certain embodiments from $-10\times10^{-7}/K$ to $15\times10^{-7}/K$, in certain embodiments from $-5\times10^{-7}/K$ to $15\times10^{-7}/K$, in certain other embodiments from $-5\times10^{-7}/K$ to $10\times10^{-7}/K$, in certain other embodiments from 0 to $15\times10^{-7}/K$, in certain other embodiments from 0 to $10\times10^{-7}/K$, in certain other embodiments from 0 to $8\times10^{-7}/K$.

According to certain embodiments of the glass-ceramic material of the present invention, which may or may not be the specific embodiments described summarily supra it comprises $Bi_2O_3$ up to 10% by weight, in certain embodiments less than 8%; in certain other embodiments less than 6%.

According to certain embodiments of the glass-ceramic material of the present invention, which may or may not be the specific embodiments described summarily supra, it comprises at least 0.2% by weight of $Bi_2O_3$. According to certain other embodiments of the glass-ceramic material of the present invention, which may or may not be the specific embodiments described summarily supra, it comprises more than 3% $Bi_2O_3$.

According to certain embodiments of the glass-ceramic material of the present invention, which may or may not be the specific embodiments described summarily supra, it comprises at least 0.5% by weight of $Bi_2O_3$ and is essentially free of tin.

According to certain embodiments of the glass-ceramic material of the present invention, which may or may not be the specific embodiments described summarily supra, it comprises at least one component selected from $SnO_2$, $TiO_2$, $CeO_2$, $WO_3$, $Nb_2O_5$ and $MoO_3$. In certain embodiments, the glass-ceramic material comprises both $SnO_2$ and $TiO_2$.

According to certain embodiments of the glass-ceramic material of the present invention, which may or may not be the specific embodiments described summarily supra, it comprises at least 0.1% by weight of $SnO_2$.

According to certain embodiments of the glass-ceramic material of the present invention, which may or may not be the specific embodiments described summarily supra, it has a composition, expressed in terms of percentage by weight of the total composition on the basis of oxides, consisting essentially of: $SiO_2$: 55-75%, in certain embodiments 60-70%, in certain other embodiments 62-69%; $Al_2O_3$: 17-22%, in certain embodiments 18-21%; $Li_2O$: 2-5%, in certain embodiments 2.5-5%; MgO: 0-3%; CaO: 0-2%, in certain embodiments 0-1%; SrO: 0-2%, in certain embodiments 0-1%; BaO: 0-2%, in certain embodiments 0-1%; ZnO: 0-4%, in certain embodiments 0-3%; $TiO_2$: 0-5%, in certain embodiments 2.5-5%; $ZrO_2$: 0-5%; $TiO_2+ZrO_2$: 2.5-6%; $SnO_2$: 0-3%, in certain embodiments 0.3-1.5%; $Bi_2O_3$: 0.1-10%, in certain embodiments 0.2-6%, in certain embodiments 0.5-6%; and $CeO_2+WO_3+Nb_2O_5+MoO_3$: 0-1%.

According to certain embodiments of the glass-ceramic material of the present invention, which may or may not be the specific embodiments described summarily supra, it comprises β-quartz solid solution as the predominant crystalline phase.

According to certain embodiments of the glass-ceramic material of the present invention, which may or may not be the specific embodiments described summarily supra, it comprises β-spodumene solid solution as the predominant crystalline phase.

According to certain embodiments of the glass-ceramic material of the present invention, which may or may not be the specific embodiments described summarily supra, it is essentially free of vanadium.

According to certain embodiments of the glass-ceramic material of the present invention, which may or may not be the specific embodiments described summarily supra, it is essentially free of $As_2O_3$ and $Sb_2O_3$.

According to certain embodiments of the glass-ceramic material of the present invention, which may or may not be the specific embodiments described summarily supra, it comprises reduced bismuth, and in certain embodiments, metallic bismuth.

A second aspect of the present invention relates to glass materials that can be cerammed into glass-ceramic materials according to the present invention. The glass material of the present invention has a composition, expressed in terms of percentage by weight of the total composition on the basis of oxides, consisting essentially of: $SiO_2$: 55-75%, in certain embodiments 60-70%, in certain other embodiments 62-69%; $Al_2O_3$: 17-22%, in certain embodiments 18-21%; $Li_2O$: 2-5%, in certain embodiments 2.5-5%; MgO: 0-3%; CaO: 0-2%, in certain embodiments 0-1%; SrO: 0-2%, in certain embodiments 0-1%; BaO: 0-2%, in certain embodiments 0-1%; ZnO: 0-4%, in certain embodiments 0-3%; $TiO_2$: 0-5%, in certain embodiments 2.5-5%; $ZrO_2$: 0-5%; $TiO_2+ZrO_2$: 2.5-6%; $SnO_2$: 0-3%, in certain embodiments 0.3-1.5%; $Bi_2O_3$: 0.1-10%, in certain embodiments 0.1-6%, in certain other embodiments 0.5-6%; and $CeO_2+WO_3+Nb_2O_5+MoO_3$: 0-1%.

According to certain embodiments of the glass material of the present invention, it has a composition, expressed in terms of percentage by weight of the total composition on the basis of oxides, consisting essentially of: $SiO_2$: 60-70%; $Al_2O_3$: 17-22%, in certain embodiments 19-21%; $Li_2O$: 2-5%, in certain embodiments 2.5-5%; MgO: 0-3%; CaO: 0-2%, in certain embodiments 0-1%; SrO: 0-2%, in certain embodiments 0-1%; BaO: 0-2%, in certain embodiments 0-1%; ZnO: 0-4%, in certain embodiments 0-3%; $TiO_2$: 0-5%; $ZrO_2$: 0-5%; $TiO_2+ZrO_2$: 2.5-6%; $SnO_2$: 0.3-1.5%; $Bi_2O_3$: 0.1-10%; $CeO_2+WO_3+Nb_2O_5+MoO_3$: 0-1%; and $Fe_2O_3$: 0-0.2%, in certain embodiments 0-0.1%.

According to certain embodiments of the glass material of the present invention, which may or may not be the specific embodiments of the glass materials of the present invention described summarily supra, it has a transmission in the visible range, measured through a flat plate sample having a thickness of 4 mm, of at least 80%.

According to certain embodiments of the glass material of the present invention, which may or may not be the specific embodiments of the glass materials of the present invention described summarily supra, it has a red color.

A third aspect of the present invention relates to articles comprising glass-ceramic material of the present invention described summarily above. Such articles may be advantageously: cooktop plates; stove windows; microwave oven plates; fireplace windows; and optical filters.

A fourth aspect of the present invention relates to a process for making a glass-ceramic article, comprising the following steps:

(A) providing a precursor glass material having a composition, expressed in terms of percentage by weight of the total composition on the basis of oxides, consisting essentially of: $SiO_2$: 55-75%, in certain embodiments 60-70%, in certain other embodiments 62-69%; $Al_2O_3$: 17-22%, in certain embodiments 18-21%; $Li_2O$: 2-5%, in certain embodiments 2.5-5%; MgO: 0-3%; CaO: 0-2%, in certain embodiments 0-1%; SrO: 0-2%, in certain embodiments 0-1%; BaO: 0-2%, in certain embodiments 0-1%; ZnO: 0-4%, in certain embodiments 0-3%; $TiO_2$: 0-5%, in certain embodiments 2.5-5%; $ZrO_2$: 0-5%; $TiO_2+ZrO_2$: 2.5-6%; $SnO_2$: 0-3%, in certain embodiments 0.3-1.5%; $Bi_2O_3$: 0.1-10%, in certain embodiments 0.1-6%, in certain other embodiments 0.5-6%; and $CeO_2+WO_3+Nb_2O_5+MoO_3$: 0-1%;

(B) forming the precursor glass material into a glass article having desired shape;

(C) subjecting the glass article resulting from step (B) to nucleating heat treatment such that crystal nuclei are allowed to form inside the glass article; and (D) subjecting the glass article of step (C) to crystal growing heat treatment such that the crystals in desirable phases are allowed to grow in the glass article to a desired extent.

According to certain embodiments of the process of the present invention, in step (A), the precursor glass has a composition, expressed in terms of percentage by weight of the total composition on the basis of oxides, consisting essentially of: $SiO_2$: 60-70%; $Al_2O_3$: 17-22%, in certain embodiments 19-21%; $Li_2O$: 2-5%, in certain embodiments 2.5-5%; MgO: 0-3%; CaO: 0-2%, in certain embodiments 0-1%; SrO: 0-2%, in certain embodiments 0-1%; BaO: 0-2%, in certain embodiments 0-1%; ZnO: 0-4%, in certain embodiments 0-3%; $TiO_2$: 0-5%, in certain embodiments 2.5-5%; $ZrO_2$: 0-5%; $TiO_2+ZrO_2$: 2.5-6%; $SnO_2$: 0.3-1.5%; $Bi_2O_3$: 0.1-10%; $CeO_2+WO_3+Nb_2O_5+MoO_3$: 0-1%; and $Fe_2O_3$: 0-0.2%, in certain embodiments 0-0.1%.

According to certain embodiments of the process of the present invention, which may or may not be the specific embodiments of the process of the present invention described summarily supra, in step (C), the nucleating heat treatment involves heating the precursor glass article to a temperature from 650 to 850° C.

According to certain embodiments of the process of the present invention, which may or may not be the specific embodiments of the process of the present invention described summarily supra, in step (D), the crystal growing heat treatment involves heating the precursor glass article to a temperature from 800 to 950° C.

According to certain embodiments of the process of the present invention, which may or may not be the specific embodiments of the process of the present invention described summarily supra, in step (D), the crystal growing heat treatment involves heating the precursor glass article to a temperature such that β-quartz solid solution is allowed to form as the predominant crystalline phase.

According to certain embodiments of the process of the present invention, which may or may not be the specific embodiments of the process of the present invention described summarily supra, in step (D), the crystal growing heat treatment involves heating the precursor glass article to a temperature from 850 to 1200° C.

According to certain embodiments of the process of the present invention, which may or may not be the specific embodiments of the process of the present invention described summarily supra, in step (D), the crystal growing heat treatment involves heating the precursor glass article to a temperature such that β-spodumene solid solution is allowed to form as the predominant crystalline phase.

According to certain embodiments of the process of the present invention, which may or may not be the specific embodiments of the process of the present invention described summarily supra, in step (A), the precursor glass material has a transmittance greater than 70% in the visible range.

According to certain embodiments of the process of the present invention, which may or may not be the specific embodiments of the process of the present invention described summarily supra, step (A) comprises the following steps:

(A1) providing the starting materials for melting the precursor glass material; and (A2) melting the starting materials to form the precursor glass material; wherein in step (A2), reduction of $Bi_2O_3$ to reduced bismuth is essentially inhibited. In certain embodiments, in step (A1), an oxidizing agent is included in the starting materials.

Various embodiments of the present invention have one or more of the following advantages. First, they enable the production of dark colored glass-ceramic material essentially free of toxic agents, such as $As_2O_3$, $Sb_2O_3$ and $V_2O_5$. Second, certain embodiments can be carried out at relatively low cost: due to, for example, the lower viscosity of the glass brought about by the presence of $Bi_2O_3$ in the glass when the glass is melted and fined, the fining and melting of the glass can be done at a relatively low temperature. Third, certain embodiments of the present invention allow for the production of glass-ceramic material having low transmission in the visible and high transmission in the infrared, making it particularly advantageous for use in cooktop plates.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

DETAILED DESCRIPTION OF THE INVENTION

Figure 1:
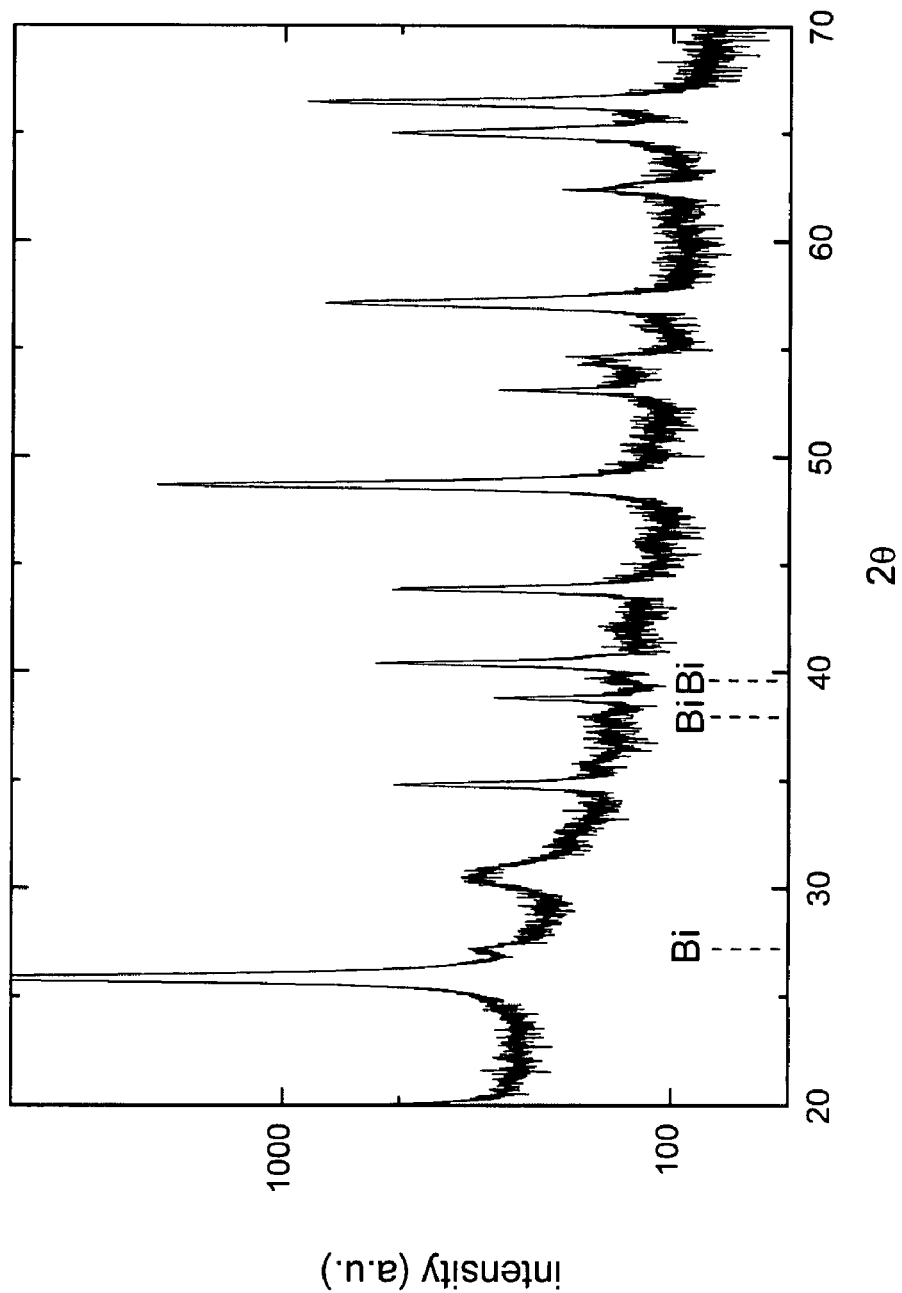
FIG. 1 is an X-ray diffraction diagram of a reduced bismuth-containing glass-ceramic material of one embodiment of the present invention.

Unless otherwise indicated, all numbers such as those expressing weight percents of ingredients, dimensions, and values for certain physical properties used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

In the present application, all percentages of the components of the glass or glass-ceramic are by weight of the total composition unless specified otherwise. The compositions of the glass or glass-ceramic materials are expressed in terms of the weight percentages of the particular chosen oxides, regardless of the actual valency of the involved metal or other elements in the materials. For example, when a composition of a glass or glass-ceramic material is discussed, the amount of Fe in the composition is calculated in terms of $Fe_2O_3$, even though Fe in the glass and the glass-ceramic materials may be present in $Fe^{2+}$ and $Fe^{3+}$ state. For another example, the amount of bismuth in the composition is calculated in terms of $Bi_2O_3$, even though Bi in the glass or glass ceramic may be present as $Bi^0$, $Bi^{3+}$ or bismuth with a valency in between. Thus, the wording "a composition comprises x % of $Bi_2O_3$" in the present application means that the total amount of bismuth in the composition is x % when calculated in terms of $Bi_2O_3$, even though bismuth may be present in the +3 state, metallic state or with a valency in between. By "metallic state," it is meant that the relevant metal, or a part thereof, is at zero valency in the material. As used herein, "reduced bismuth" means bismuth with a valency less than 3, including bismuth at metallic state. Thus reduced bismuth can be represented by the general formula $Bi_2O_{3-x}$, where $0<x\leq3$. Reduced bismuth in the glass and glass-ceramic material of the present invention may be present as amorphous phase, crystalline phase with various sizes of crystallites, and combinations and/or mixtures thereof.

By the term "consisting essentially of," it is meant that the material of the present invention may comprise components in addition to those listed, as long as those additional components, in their added amounts, do not alter the basic and novel feature of the present invention.

"The visible range" of the light spectrum, or "the visible spectrum," means the segment from 400 nm to 700 nm on the electromagnetic spectrum.

By "colorless," it is meant that the glass is essentially free of absorption peaks in the visible range as defined herein. In certain embodiments, the glass of the present invention has a red shift of absorption edge of less than 20 nm, in certain embodiments less than 10 nm, in certain other embodiments less than 5 nm, compared to the absorption edge of a fully-oxidized glass having essentially the same composition. "Absorption edge" as used herein means the longest wavelength shorter than 700 nm at which the internal transmission of the glass is 50% of that at 700 nm. "Internal transmission" means the percentage of light transmitted at the specified wavelength per millimeter, with surface reflection loss corrected. "Fully oxidized" means that essentially all metals in the glass composition are oxidized to the highest possible valency in the glass under the melting conditions. Certain colorless glass of the present invention has an average transmission without surface loss correction of at least 80% at a thickness of 4 mm, and a transmission variation, defined as the peak-to-valley transmission difference across the wavelength span from 420 to 650 nm, of less than or equal to 8%. In certain embodiments, the transmission variation is less than or equal to 5%, in certain other embodiments, the transmission variation is less than or equal to 3%. "Transmission" as used herein means measured transmission without surface reflection loss correction unless otherwise specified to be "internal transmission."

Coefficient of thermal expansion ("CTE") as used in the present invention means linear coefficient of thermal expansion measured from room temperature to 700° C.

Glass-ceramic materials were described in, e.g., Wolfram Holand and George Beall, *Glass-Ceramic Technology* (The American Ceramic Society, 2002). This reference describes glass-ceramic materials comprising β-quartz solid solution or β-spodumene solid solution as the predominant crystalline phase. One of ordinary skill in the art understands the meaning of the terms such as glass-ceramic, glass-ceramic materials comprising β-quartz solid solution as the predominant crystalline phase, glass-ceramic materials comprising β-spodumene solid solution as the predominant crystalline phase, and the like. The term "β-quartz" in the present application includes β-quartz in the strict sense and stuffed derivatives thereof, such as β-eucryptite.

Glass-ceramic materials comprising β-quartz and/or β-spodumene solid solutions as the predominant crystalline phases are known to have low CTE. The low CTE, along with other physical properties, makes such glass-ceramic materials good choices for use in cooktop plates, cooking utensils and the like.

Glass-ceramic materials may be colored by the use of various coloring agents. As mentioned above, a popular coloring agent for imparting a dark brown or near black color to β-quartz and/or βspodumene glass-ceramic material is $V_2O_5$. The amount of $V_2O_5$ introduced into the precursor glass and the glass-ceramic materials is typically lower than 0.3% by weight in existing commercially available products. Such low amount is sufficient to generate the desired dark color to a 4 mm thick plate when the glass composition and ceramming conditions are properly chosen. Such low amount of $V_2O_5$ typically does not affect the melting and fining temperatures of the glass significantly.

The present inventors have found that bismuth can be used effectively in a glass-ceramic material, especially those comprising β-quartz and/or β-spodumene solid solutions as the predominant crystalline phases, to impart color to the material. Indeed, the present inventors have found that bismuth can be used in the glass-ceramic material of the present invention to impart intense dark brown to black color to the material. Therefore, bismuth can be used to replace, in whole or in part, the traditional colorant vanadium as used in the existing dark-color glass-ceramic materials. In certain embodiments of the present invention, the bismuth-containing glass-ceramic is essentially free of $V_2O_5$—i.e., the material does not contain any intentionally added $V_2O_5$, even though $V_2O_5$ may be found as impurities in the material. In other embodiments of the present invention, both $V_2O_5$ and $Bi_2O_3$ are included in the precursor glass materials for the glass-ceramic material of the present invention.

In one embodiment, the amount of bismuth in the composition of the glass-ceramic and precursor glass thereof of the present invention, expressed in terms of weight percentage on the basis of $Bi_2O_3$ can be up to 10%. If $Bi_2O_3$ is included at higher than 10%, undesirable phase separation, overly large crystallite size, opacification of the glass-ceramic material could result and durability of the glass-ceramic material could suffer.

In one embodiment, the amount of bismuth in the composition of the glass-ceramic and precursor glass thereof of the present invention, expressed in terms of weight percentage on the basis of $Bi_2O_3$, is 0.1-10%. If $Bi_2O_3$ is included at lower than 0.1%, it is difficult to impart intense color to the resulting glass-ceramic material. For glass-ceramic material comprising β-quartz solid solution as the predominent crystalline phase, it can be desirable to contain $Bi_2O_3$ less than 6.0% by weight, for example.

Bismuth-containing glass-ceramic material of the present invention having an intense dark color can be produced. In certain embodiments of the present invention, the glass-ceramic material has a total transmission in the visible range, measured on a flat plate sample at a thickness of 4 mm, of less than 50%, in certain embodiments less than 30%, in certain other embodiments less than 10%, in certain embodiments less than 5%, in certain other embodiments less than 3%, in certain other embodiments less than 2%. Such dark glass-ceramic material of the present invention may be $V_2O_5$-containing or is essentially free of $V_2O_5$. In certain embodiments of such dark-colored glass-ceramic of the present invention, they contain β-quartz and/or β-spodumene solid solution as the predominant crystalline phases. To impart an intense dark color to the glass-ceramic material, it is typically desired that the glass-ceramic material comprises higher than 0.8% by weight of $Bi_2O_3$. Typically, 0.3-1.2% of $Bi_2O_3$ included in the composition of the glass-ceramic of the present invention can impart a deep red-brown color to the material.

However, the bismuth-containing glass-ceramic material of the present invention can have high transmission in the infrared. In certain embodiments, the glass-ceramic material of the present invention has a transmission at 2600 nm, measured on a flat plate sample at a thickness of 4 mm, of higher than 50%, in certain embodiments higher than 60%, in certain embodiments higher than 75%, in certain other embodiments higher than 80%. In certain embodiments, the glass-ceramic material of the present invention has a transmission at 2200 nm, measured on a flat plate sample at a thickness of 4 mm, of higher than 50%, in certain embodiments higher than 60%, in certain embodiments higher than 75%, in certain other embodiments higher than 80%. Such IR-transmissive glass-ceramic material of the present invention may be $V_2O_5$-containing or is essentially free of $V_2O_5$. In certain embodiments of such IR-transmissive glass-ceramic material of the present invention, they contain β-quartz and/or β-spodumene solid solution as the predominant crystalline phases. Generally, in order to obtain high transmission in the infrared region, it is desired that the glass and glass-ceramic material of the present invention comprises $Fe_2O_3$ at a very low level. Certain embodiments of the glass and glass-ceramic material of the present invention comprise $Fe_2O_3$ at 0-0.2%, in certain other embodiments less than 0.1%, in certain other embodiments less than 800 ppm by weight, in certain other embodiments less than 600 ppm by weight, in certain other embodiments essentially zero. In certain embodiments of such IR-transmissive glass-ceramic material of the present invention, they further have a dark color featured by the transmission in the visible range described in the immediately preceding paragraph.

The glass-ceramic material of the present invention, especially those containing β-quartz and/or β-spodumene solid solution as the predominant crystalline phase, particularly those containing β-quartz solid solution as the predominant crystalline phase, can have a very low CTE. In certain embodiments, the glass-ceramic material of the present invention has a CTE at 0-700° C. of from $-10\times10^{-7}$/K to $15\times10^{-7}$/K, in certain embodiments from $-5\times10^{-7}$/K to $15\times10^{-7}$/K, in certain other embodiments from $-5\times10^{-7}$/K to $10\times10^{-7}$/K, in certain other embodiments from 0 to $15\times10^{-7}$/K, in certain other embodiments from 0 to $10\times10^{-7}$/K, in certain other embodiments from 0 to $8\times10^{-7}$/K. Typically, in embodiments of glass-ceramic materials of the present invention having a CTE at 0-700° C. of from $-5\times10^{-7}$/K to $5\times10^{-7}$/K, they tend to comprise β-quartz solid solution as the predominant crystalline phase.

Without the intention or the necessity to be bound by any particular theory, it is believed that the color-imparting, or absorbing, bismuth species in the glass-ceramic material of the present invention is reduced bismuth. If bismuth is present in the glass or glass-ceramic material in the form of $Bi_2O_3$ only, it would not cause significant absorption or impart significant color to the glass or glass-ceramic material in the visible range. It is further believed, and desired, that the reduced bismuth is formed during the ceramming process by, at least partly, reduction of $Bi_2O_3$ in the ceramming process.

Obviously, the presence in the precursor glass of at least one reducing agent capable of reducing $Bi_2O_3$ to reduced bismuth under the ceramming condition is required for the above color-imparting reactions to occur. The overall ceramming condition is therefore desired to be thermodynamically favorable for the reduction of bismuth oxide(s) under this theory.

The ceramming process is a very complex chemical process, in which the formation of crystalline phases occurs and the crystallites grow. As a result, the remaining glassy phase may undergo composition change. The material becomes inhomogeneous in short range, such as on nanometer scale. X-ray diffraction diagram and scanning electronic microscope (SEM) can be used to detect the various crystalline phases and observe the presence of crystallites once the ceramming has progressed to a certain stage and the crystallites grow large enough.

One of the results of the progression of the ceramming process before the ceramming is completed is the enlargement of the volume percentage of the predominant crystalline phases (such as those of β-quartz solid solution and/or β-spodumene solid solution) and the reduction of the volume percentage of the glassy phase. The net result would be the distribution of bismuth (including $Bi_2O_3$ and reduced bismuth) and other components, which do not form part of the predominant crystalline phases, in a much smaller, confined volume than in the precursor glass essentially free of crystalline phases at a significantly higher concentration. The effect of such enriching could include, inter alia: (i) furthering the reduction of bismuth oxide(s); and (ii) aggregation of reduced bismuth in limited volume, both of which are believed to be conducive to imparting more intense color to the glass-ceramic material.

Reduced bismuth may take the form of a separate amorphous phase, colloidal dispersion in the glassy phase, or a crystalline phase with various crystallite sizes, or combination and mixtures thereof. The reduced bismuth may be present in the glassy phase, on the surface of other crystalline phases such as the predominant crystalline phases, or both. It is believed that the size and volume fraction of the reduced bismuth phase has to reach a certain threshold before current X-ray diffraction analytical tools can be used to detect their presence. It is also believed that reduced bismuth phase non-detectable by current X-ray diffraction technology, if present in the precursor glass material or in the glass-ceramic material upon ceramming at significant amount, could cause absorption and impart color to the material. For example, it has been observed that certain bismuth-containing precursor glass exhibits a reddish color, presumably due to the presence of reduced bismuth formed during the glass melting process.

The present inventors have found that various reducing agents, or materials capable of producing reducing agents during the glass melting process, can be included in the precursor glass of the glass-ceramic material of the present invention. Examples of such components and/or reducing agents include, but are not limited to: FeO, $SnO_2$, $As_2O_3$, $Sb_2O_3$, $CeO_2$, $TiO_2$, $WO_3$, $MoO_3$, $Nb_2O_5$. Of these agents, $SnO_2$, $As_2O_3$, $Sb_2O_3$, $CeO_2$, $WO_3$, $MoO_3$ and $Nb_2O_5$ can function as fining agents in the glass melting process as well. During the fining stage of the glass-melting process, the following reactions are favored:

$$SnO_2 \rightarrow SnO + \tfrac{1}{2}O_2 \text{ (gas)}$$

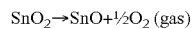

$$As_2O_5 \rightarrow As_2O_3 + O_2 \text{ (gas)}$$

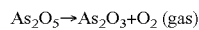

$$Sb_2O_5 \rightarrow Sb_2O_3 + O_2 \text{ (gas)}$$

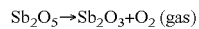

$$2MoO_3 \rightarrow Mo_2O_5 + \tfrac{1}{2}O_2 \text{ (gas)}$$

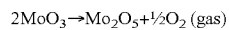

$$2WO_3 \rightarrow W_2O_5 + \tfrac{1}{2}O_2 \text{ (gas)}$$

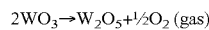

$$Nb_2O_5 \rightarrow 2NbO_2 + \tfrac{1}{2}O_2 \text{ (gas)}.$$

The $O_2$ gas generated due to the above reactions during the fining process of the glass facilitates the levitation of the gas bubbles already present in the glass, leading to lower bubble count and clearer glass. The thus formed reducing species SnO, $As_2O_3$, $Sb_2O_3$, $Mo_2O_5$, $W_2O_5$ and $NbO_2$ can all function as reducing agents in reactions with $Bi_2O_3$ in the ceramming process during which the precursor glass is heated to the ceramming temperature. Thus, the following reactions may occur in the ceramming step:

$$Bi_2O_3 + xSnO \rightarrow Bi_2O_{3-x} + xSnO_2.$$

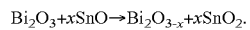

It is known that $SnO_2$ can function as a nucleating agent as well when a precursor glass is cerammed into glass-ceramic. It is believed that compared to SnO, $SnO_2$ is a more effective nucleating agent. Therefore, the reduction of $Bi_2O_3$ according to the above reaction, by increasing the concentration of $SnO_2$ in the glass, can indirectly increase the efficiency of the ceramming process.

It is also believed that Ti may be present in the precursor glass at +4 ($Ti^{4+}$) and +3 ($Ti^{3+}$) valencies. $Ti^{3+}$ can reduce $Bi_2O_3$ into $Bi_2O_{3-x}$ as well under the ceramming conditions. It is further believed that FeO, if present in the precursor glass, can reduce $Bi_2O_3$ into reduced bismuth under the ceramming condition as well.

Among the above enumerated reducing agents, $SnO_2$ is the most preferred due to environmental friendliness and high reducing efficiency. Therefore, in certain embodiments of the present invention, the glass-ceramic material comprises tin oxide (in $Sn^{4+}$ and/or $Sn^{2+}$ states). In certain embodiments of the present invention, the precursor glass material of the glass-ceramic material of the present invention comprises tin oxide (at least partly in $Sn^{2+}$ state). In certain embodiments of the present invention, during the melting of precursor glass of the glass-ceramic material of the present invention, $SnO_2$ is included in the batch material. If $SnO_2$ is present in the composition of glass-ceramic material and the precursor glass thereof of the present invention, it is generally desired to be in the range of 0.1-3% by weight. If $SnO_2$ is included in the composition at higher than 3%, it can cause undesired devitrification problem to the glass melting process. The present inventors have found that the presence of $SnO_2$ in the composition, in the amount of 0.1-3%, together with proper amount of $Bi_2O_3$ in the composition, can impart a very intense dark color (i.e., high degree of absorption in the visible range) to the glass-ceramic material. Indeed, the effect on color generation of inclusion of $SnO_2$ in the composition is so pronounced that $Bi_2O_3$ can be included at a significantly lower amount to impart a dark color at essentially the same intensity (i.e., a comparable level of absorption in the visible range). Thus, in certain embodiments, in the composition of the glass-ceramic material and precursor glass material thereof of the present invention, $Bi_2O_3$ is included at least 0.2% and $SnO_2$ is included at least 0.1%. In certain other embodiments, the composition is essentially free of tin and includes at least 0.5% of $Bi_2O_3$.

The glass-ceramic material of the present invention, when comprising β-quartz and/or β-spodumene solid solutions as the predominant crystalline phase, is desired to have a composition, expressed in terms of percentage by weight of the total composition on the basis of oxides, consisting essentially of: $SiO_2$: 55-75%, in certain embodiments 60-70%, in certain other embodiments 62-69%; $Al_2O_3$: 17-22%, in certain embodiments 18-21%; $Li_2O$: 2-5%, in certain embodiments 2.5-5%; MgO: 0-3%; BaO: 0-2%, in certain embodiments 0-1%; CaO: 0-2%, in certain embodiments 0-1%; SrO: 0-2%, in certain embodiments 0-1%; ZnO: 0-4%, in certain embodiments 0-3%; $TiO_2$: 0-5%, in certain embodiments 2.5-5%; $ZrO_2$: 0-5%; $TiO_2+ZrO_2$: 2.5-6%; $SnO_2$: 0-3%, in certain embodiments 0.3-1.5%; $Bi_2O_3$: 0.1-10%, in certain embodiments 0.1-6.0%, in certain other embodiments 0.5-6%; $CeO_2+WO_3+Nb_2O_5+MoO_3$: 0-1%.

In certain other embodiments, the glass-ceramic material of the present invention, when comprising β-quartz and/or β-spodumene solid solution as the predominant crystalline phase, is desired to have a composition, expressed in terms of percentage by weight of the total composition on the basis of oxides, consisting essentially of: $SiO_2$: 60-70%; $Al_2O_3$: 17-22%, in certain embodiments 19-21%; $Li_2O$: 2-5%, in certain embodiments 2.5-5%; MgO: 0-3%; BaO: 0-2%, in certain embodiments 0-1%; CaO: 0-2%, in certain embodiments 0-1%; SrO: 0-2%, in certain embodiments 0-1%; ZnO: 0-4%, in certain embodiments 0-3%; $TiO_2$: 0-5%, in certain embodiments 2.5-5%; $ZrO_2$: 0-5%; $TiO_2+ZrO_2$: 2.5-6%; $SnO_2$: 0.3-1.5%; $Bi_2O_3$: 0.1-6%; $CeO_2+WO_3+Nb_2O_5+MoO_3$: 0-1%; and $Fe_2O_3$: 0-0.2%, in certain embodiments 0-0.1%.

Due to the low CTE of glass-ceramic materials comprising β-quartz solid solution as the predominant crystalline phase, glass-ceramic materials of the present invention comprising β-quartz solid solution as the predominant crystalline phase and reduced bismuth as an absorbing species are particularly advantageous for many applications where low CTE is desired.

It is known that glass-ceramic materials comprising β-spodumene solid solution as the predominant crystalline phase can be produced by: (i) subjecting glass-ceramic material comprising β-quartz solid solution as the predominant crystalline phase to heat treatment involving an elevated temperature, such as a temperature higher than the ceramming temperature used for producing the β-quartz glass-ceramic, where the β-quartz crystalline phase is allowed to convert into β-spodumene crystalline phase; or (ii) subjecting the precursor glass capable of being cerammed into a glass-ceramic material comprising β-quartz solid solution as the predominant crystalline phase to heat treatment involving an elevated temperature, such as a temperature higher than the ceramming temperature used for producing the β-quartz glass-ceramic, where the β-spodumene crystalline phase is allowed to form in the precursor glass body.

The glass-ceramic materials comprising β-spodumene solid solution as the predominant crystalline phase according to certain embodiments of the present invention typically exhibit slightly higher CTE than the glass-ceramic materials having essentially the same composition and β-quartz solid solution as the predominant crystalline phase. Nonetheless, such β-spodumene glass-ceramic material are still considered low CTE materials and can be employed in many applications requiring a low CTE, such as cooktop plates, and the like.

In the above embodiments of the glass-ceramic material of the present invention having the specified compositional ranges, the precursor glass contains $Li_2O$, $SiO_2$ and $Al_2O_3$ as the essential constituents of the β-quartz and/or β-spodumene solid solution phase which provides very low thermal expansion and optical transmittance in a glass ceramic. The amount of $Al_2O_3$ is limited to the range 17-22%, in certain other embodiments 18-21%, in certain other embodiments 19-21%. If it is higher than 22%, the glass becomes difficult to melt, and residual stones can form and devitrification can occur during forming.

In the above embodiments of the glass-ceramic material of the present invention having the specified compositional ranges, as mentioned supra, the amount of $Bi_2O_3$ is desired to be 0.2-6.0% if β-quartz is desired as the predominant crystalline phase. Typically, if $Bi_2O_3$ content is 0.3-1.2%, a deep red-brown color can be obtained for the glass-ceramic of the present invention. $Bi_2O_3$ higher than 6%, but lower than 10% can be used for glass-ceramic of the present invention comprising β-spodumene solid solution as the predominant crystalline phase.

In the above embodiments of the glass-ceramic material of the present invention having the specified compositional ranges, the minimum amount of $Li_2O$ is 2.0%. Below that, the glass becomes too difficult to melt and thermal expansion increases.

In the above embodiments of the glass-ceramic material of the present invention having the specified compositional range, $TiO_2$ and $ZrO_2$ are the primary nucleating agents. As mentioned supra, it is believed that $SnO_2$ (but not SnO) functions as a nucleating agent as well during the ceramming of the glass-ceramic material of the present invention. The precursor glass contains at least 2.5 wt % in total of $TiO_2$ and $ZrO_2$ to assure effective nucleation. The amount of $ZrO_2$ is limited to below or equal to 5 wt %. Above this value, melting temperatures increase strongly, unmelted residuals and devitrification may occur. The amount of $TiO_2$ is limited to below or equal to 5%, in certain embodiments preferably below or equal to 3%. At higher $TiO_2$ contents, crystallization becomes more unstable and difficult to control. Formation and separation of rutile phase can occur. The present inventors have discovered the presence of $TiO_2$ is conducive to the formation of an intense dark color to the glass-ceramic material, presumably due to the reducing effectiveness of reduced titanium on $Bi_2O_3$ during the ceramming process as discussed supra. Therefore, in certain embodiments of the glass-ceramic material of the present invention, it is preferred that the $TiO_2$ content is at least 2.5%.

In the above embodiments of the glass-ceramic material of the present invention having the specified compositional ranges, ZnO and alkaline earth oxides (CaO, MgO, SrO and/or BaO) are beneficial components for the microstructural evolution during ceramming of the precursor glass, and can affect the amount and softening point of the residual glassy phase. They furthermore influence the CTE of the glass-ceramic material. Without the intention or necessity to be bound by any particular theory, it is believed that: while SrO and BaO generally remain in the glassy phase, MgO and partly ZnO can enter the crystallites of the predominant crystalline phases. The presence of MgO, BaO and SrO increases the CTE of the glass-ceramic material while the presence of ZnO decreases it. The heavier elements Ba and Sr also affect the refractive index of the remaining glassy phase and thus affect turbidity. MgO at higher than 3% could lead to larger crystallites, too high a CTE and unacceptably inhomogeneous crystallization. If SrO and BaO are too high, thermal expansion becomes unacceptable. The content of BaO is therefore limited to below or equal to 2%, the amount of SrO to below or equal to 2%, and ZnO to below or equal to 4%. In certain embodiments, the sum total of the contents of MgO, ZnO, BaO and SrO is preferred to be higher than 2%, and more preferably the sum total of the contents of MgO and ZnO is higher than 2%. In certain embodiments, the glass-ceramic is desired to be free of BaO because of environmental reasons.

In the above embodiments of the glass-ceramic material of the present invention having the specified compositional range, the precursor glass can contain $SnO_2$. Its major role is to act as redox partner for $Bi_2O_3$ as explained above. In combination with $Bi_2O_3$, it also assures fining of the glass melt as discussed supra and infra. As discussed supra, $SnO_2$ is also known to function as a nucleating agent. If its amount exceeds 3.0%, devitrification might occur during forming, and unmelted residuals might be found in the precursor glass. In certain embodiments, it is preferred that the amount of $SnO_2$ is limited to 0.3-1.5%. If in the presence of more than 0.6% $TiO_2$, the amount of $SnO_2$ is preferably limited to 0.3-0.8%.

In the above embodiments of the glass-ceramic material of the present invention having the specified compositional range, the precursor glass might also contain minor amounts of other redox partners of $Bi_2O_3$, such as up to 1% of $CeO_2$, $WO_3$, $MoO_3$ and $Nb_2O_5$, and/or up to 0.2% $Fe_2O_3$.

Another aspect of the present invention is the precursor glass material of the glass-ceramic material as described supra. Although characterized as a precursor glass of the glass-ceramic material of the present invention described supra, the glass material, as an independent composition of matter, is not limited to that particular use. In certain embodiments, the glass of the present invention has a composition, expressed in terms of percentage by weight of the total composition on the basis of oxides, consisting essentially of: $SiO_2$: 55-75%, in certain embodiments 60-70%, in certain other embodiments 62-69%; $Al_2O_3$: 17-22%, in certain embodiments 18-21%; $Li_2O$: 2-5%, in certain embodiments 2.5-5%; MgO: 0-3%; BaO: 0-2%, in certain embodiments 0-1%; CaO: 0-2%, in certain embodiments 0-1%; SrO: 0-2%, in certain embodiments 0-1%; ZnO: 0-4%, in certain embodiments 0-3%; $TiO_2$: 0-5%, in certain embodiments 2.5-5%; $ZrO_2$: 0-5%; $TiO_2+ZrO_2$: 2.5-6%; $SnO_2$: 0-3%, in certain embodiments 0.3-1.5%; $Bi_2O_3$: 0.1-6%, in certain embodiments 0.5-6%; $CeO_2+WO_3+Nb_2O_5+MoO_3$: 0-1%; and $Fe_2O_3$: 0-0.2%, in certain embodiments 0-0.1%.

In certain other embodiments of the glass material of the present invention, it has a composition, expressed in terms of percentage by weight of the total composition on the basis of oxides, consisting essentially of: $SiO_2$: 60-70%; $Al_2O_3$: 17-22%, in certain embodiments 19-21%; $Li_2O$: 2-5%, in certain embodiments 2.5-5%; MgO: 0-3%; BaO: 0-2%, in certain embodiments 0-1%; CaO: 0-2%, in certain embodiments 0-1%; SrO: 0-2%, in certain embodiments 0-1%; ZnO: 0-4%, in certain embodiments 0-3%; $TiO_2$: 0-5%, in certain embodiments 2.5-5%; $ZrO_2$: 0-5%; $TiO_2+ZrO_2$: 2.5-6%; $SnO_2$: 0.3-1.5%; $Bi_2O_3$: 0.1-6%; $CeO_2+WO_3+Nb_2O_5+MoO_3$: 0-1%; and $Fe_2O_3$: 0-0.2%, in certain embodiments 0-0.1%.

Some of the glass materials of the present invention may exhibit a reddish color. Without the intention or necessity to be bound by any particular theory, the present inventors believe this is caused by the presence of reduced bismuth in the glass body. The absorption and/or scattering of the reduced bismuth, even at a low concentration typically non-detectable by X-ray diffraction, can cause such coloration. Such red glass may be in and of itself desirable in certain applications. However, the present inventors have unexpectedly found that, if dark colored glass-ceramic article is desired, it is generally preferred that the glass does not exhibit a reddish color. Thus in those embodiments, it is advantageous that the glass is essentially free of metallic bismuth; it is even more advantageous that the glass is essentially free of reduced bismuth. In certain embodiments, it is desired that the glass has high transmission in the visible of at least 80% at a thickness of 4 mm without surface reflection loss correction. The present inventors have found that, surprisingly, glass-ceramic with high absorption in the visible can be obtained from such highly transmissive precursor glass materials.

A third aspect of the present invention is articles comprising the glass-ceramic material of the present invention. Such articles can be advantageously cooktop plates, stove windows, reactor windows, fireplace windows, automotive windows, optical filters, and other devices where the properties of the glass-ceramic material of the present invention, such as low CTE, transmission in the visible and infrared, and the like, are desired. The dark glass-ceramic materials transmissive in the infrared are especially advantageous for use as cooktop plates.

A fourth aspect of the present invention involves a process for making glass-ceramic article comprising the glass-ceramic material of the present invention. In general, the process comprises the following steps:

(A) providing the precursor glass material;
(B) forming the precursor glass material into a glass article having desired shape;
(C) subjecting the glass article resulting from step (B) to nucleating heat treatment such that crystal nuclei are allowed to form inside the glass article; and
(D) subjecting the glass article of step (C) to crystal growing heat treatment such that the crystals in desirable phases are allowed to grow in the glass article to a desired extent.

Steps (A) and (B) may be carried out at least partly simultaneously. Thus, the glass may be melted and formed into the desired shape by, e.g., pressing, casting, rolling, and the like, during the step of cooling the melted glass. Alternatively, step (B) may be carried out after step (A). Thus, the glass may be first melted and allowed to cool, followed by shaping such as carving, fusing, reheating and pressing, casting, rolling, and the like. It is typically desired that the glass does not devitrify during the cooling and/or forming steps.

Steps (C) and (D) can be carried out at least partly simultaneously. Thus, the precursor glass may be heated to a nucleating temperature zone where the nuclei are allowed to form and at least a part of the crystalline phase are allowed to form as well during the nucleating step. Alternatively, step (D) may be carried out after step (C). Thus, during the nucleating stage, the desired predominant crystalline phase in the glass-ceramic material does not form to a significant volume (such as not to an extent detectable by X-ray diffraction). Thereafter, in the ceramming stage, the desired predominant crystalline phases in the glass-ceramic material are allowed to form in step (D). Typically, in this case, step (D) involves heating the article to a temperature higher than that of step (C). Typically, in step (C), the desired nucleating temperature is 650-850° C., if glass-ceramic of the present invention having β-quartz and/or β-spodumene solid solutions as the predominant crystalline phases are desired.

To obtain the desired final predominant crystalline phase in the glass-ceramic material and crystallite sizes thereof in the glass-ceramic material, control of the temperature of step (D) (assuming that step (D) will be conducted at an essentially constant pressure such as atmospheric pressure as is typically employed) is desirable. By varying the temperature of step (D), one can obtain, e.g., glass-ceramic material comprising (i) β-quartz solid solution as the predominant crystalline phase, (ii) β-spodumene solid solution as the predominant crystalline phase; or (iii) both β-quartz and β-spodumene solid solutions at significant volume proportions. In certain embodiments, to obtain β-quartz solid solutions as the predominant crystalline phase, in step (D), the temperature is 850-950° C. In certain embodiments, to obtain β-spodumene solid solution as the predominant crystalline phase, in step (D), the temperature is chosen to be from 850 to 1200° C., in certain embodiments from 950 to 1200° C. The desired temperature of step (D) is dependent on the weight percentage of $Bi_2O_3$ in the glass composition. Typically, the higher the amount of $Bi_2O_3$, the lower the temperature is required to obtain a glass-ceramic material having β-spodumene solid solution as the predominant crystalline phase.

According to certain embodiments of the process of the present invention, step (A) comprises the following steps:

(A1) providing the starting materials for melting the precursor glass material; and (A2) melting the starting materials to form the precursor glass material;

wherein in step (A2), reduction of $Bi_2O_3$ to reduced bismuth is essentially inhibited.

As mentioned supra, the avoidance of the formation of reduced bismuth in the precursor glass is desired in order to obtain a glass-ceramic material having an intense dark color.

One way to avoid or inhibit the reduction of $Bi_2O_3$ in the glass melting process is to introduce an oxidizing agent into the starting materials (batch materials, cullets, and the like) for melting the glass. Such oxidizing agent may be a nitrate, such as $LiNO_3$, $NH_4NO_3$, and the like.

The present inventors have found that, by introducing significant amounts of $Bi_2O_3$ into the starting materials, the glass can be melted and fined at a temperature significantly lower than a comparable glass that does not contain $Bi_2O_3$. This is because the use of $Bi_2O_3$ in the present invention at such significant amount reduces the viscosity of the glass melt significantly at a given temperature compared to compositions essentially free of $Bi_2O_3$. The lower viscosity of the glass melt allows for efficient mixing and reaction of the glass components during melting, and faster levitation of the gas bubbles during fining. Such lower melting and/or fining temperatures translate into lower cost of glass melting tank, longer tank life cycle, and lower cost of the glass and glass-ceramic materials. Typically, according to the present invention, the higher the amount of $Bi_2O_3$ in the glass, the lower the viscosity of the glass would be at a given melting temperature, assuming the balance of the glass composition remains the same. This constitutes an advantage of embodiments of the process, the glass material, the glass-ceramic material and the articles of the present invention.

The present invention is further illustrated by the following non-limiting examples.

EXAMPLES

Glass materials having compositions indicated in TABLE I were melted. Crucibles filled with raw starting materials were put into a preheated furnace at 1400° C. This was followed by a gradual increase of the temperature up to 1650-1660° C. at a rate of 2 K/minute. Afterwards, the temperature was held constant for 3 hours before pouring the glass melt onto a preheated graphite plate, where it was roll-pressed to a thickness of 4 mm. Derived glass plates of 20 cm×30 cm were then annealed at 650° C., and slowly cooled afterwards.

The glassy plates derived in this way were essentially colorless to reddish, dependent on the content of $SnO_2$.

A subsequent crystallization treatment was then performed according to the ceramming schedule shown in TABLE I.

Color of the glass-ceramic developed upon ceramming are also indicated in TABLE I.

Example No. 15 is a comparative example in that it does not comprise bismuth. From this example, it is observed that if no bismuth is present, distinctively different colors can be obtained in the same type of materials.

From Example Nos. 11 to 14, the content of $Bi_2O_3$ gradually decreases. As can be seen from TABLE I, the color intensity of the glass-ceramic decreases correspondingly. The compositions of the glass-ceramic of the present invention vary in their $SnO_2$ contents. As mentioned supra, $SnO_2$ is a preferred redox partner for $Bi_2O_3$ in the present invention. If no $SnO_2$ is present, colors developed in the glass-ceramic materials are generally lighter, i.e., the color change upon ceramming is much less significant, even at comparably high $Bi_2O_3$ contents (Example No. 5). At above a certain level, increasingly higher $SnO_2$ contents do not result in increasingly more significant color change to the glass-ceramic, though, when $TiO_2$ is present (Example Nos. 3 and 6).

It was discovered that when $TiO_2$ is present, the glass can be cerammed in a shorter ceramming cycle to result in glass-ceramic material having essentially the same degree of ceramization.

FIG. 1 is an XRD diagram of a glass-ceramic material according to the present invention. From the diagram, it is clear that reduced and/or metallic bismuth are present in the material.

Figure 2:
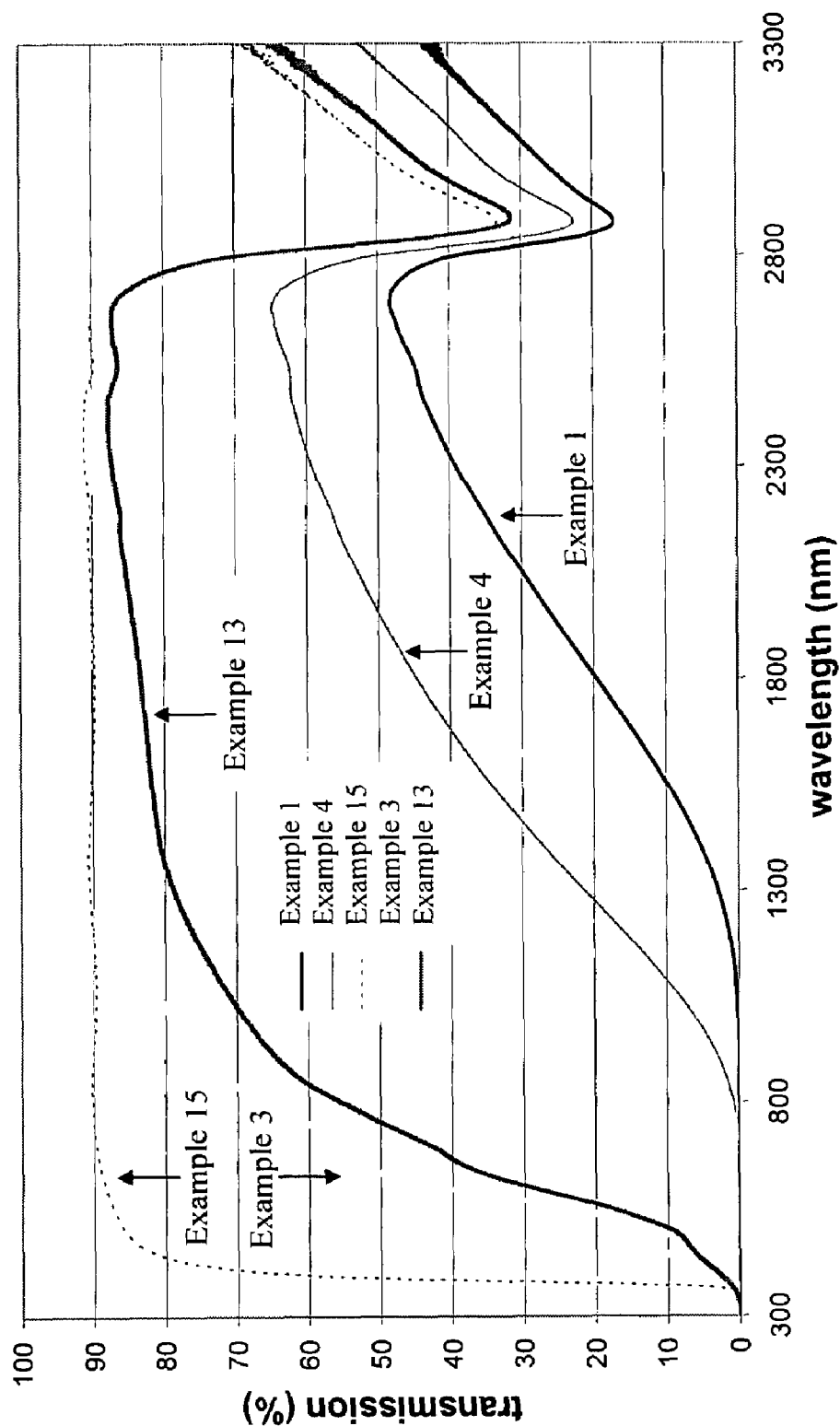
FIG. 2 is a diagram showing the transmission curves of a series of glass-ceramic materials, including several of the present invention, in the wavelength range of 300 nm to 3300 nm.

FIG. 2 is a diagram showing the transmission curves of a series of examples of the glass-ceramic material of the present invention and a comparative example 15 which does not comprise intentionally added $Bi_2O_3$.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

TABLE I

| | Example No. | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15(C)* | 16 | 17 |
| $SiO_2$ | 66 | 64.2 | 67.4 | 66.7 | 66.1 | 67.1 | 68 | 65.7 | 67.6 | 67.4 | 67.7 | 67.9 | 67.9 | 68.2 | 68.1 | 69.5 | 70.5 |
| $Al_2O_3$ | 19.5 | 19 | 19.8 | 19.7 | 19.5 | 19.7 | 20 | 19.3 | 20 | 19.8 | 20 | 20.1 | 20.5 | 20.6 | 20.1 | 18.6 | 18.8 |
| $Li_2O$ | 3.4 | 3.3 | 3.5 | 3.4 | 3.5 | 3.5 | 3.4 | 3.3 | 3.5 | 3.5 | 3.5 | 3.5 | 2.8 | 2.8 | 3.5 | 2.4 | 2.4 |
| MgO | 1.2 | 1.1 | 1.2 | 1.2 | 1.2 | 1.2 | 1.2 | 1.2 | 1.2 | 1.2 | 1.2 | 1.2 | 1.4 | 1.4 | 1.2 | 2.6 | 2.6 |
| ZnO | 1.6 | 1.5 | 1.6 | 1.6 | 1.6 | 1.6 | 2.4 | 2.3 | 1.6 | 1.6 | 1.6 | 1.6 | 2.5 | 2.5 | 1.6 | 1.3 | 1.3 |
| $TiO_2$ | 2.5 | 2.4 | 2.6 | 2.5 | 2.6 | 2.6 | — | — | 2.6 | 2.6 | 2.6 | 2.6 | — | — | 2.6 | — | — |
| $ZrO_2$ | 1.7 | 1.6 | 1.7 | 1.7 | 1.7 | 1.7 | 3 | 3 | 1.7 | 1.7 | 1.7 | 1.7 | 2.9 | 2.9 | 1.7 | 3.6 | 3.1 |
| BaO | 0.8 | 0.8 | 0.8 | 0.8 | 0.8 | 0.8 | 0.5 | 0.5 | 0.8 | 0.8 | 0.8 | 0.8 | — | — | 0.8 | — | — |
| $SnO_2$ | 0.4 | 0.4 | 0.4 | 0.4 | — | 0.8 | — | — | — | 0.4 | 0.4 | 0.4 | 1.5 | 1.5 | 0.4 | 0.78 | 0.8 |
| $Bi_2O_3$ | 2.9 | 5.7 | 1 | 2 | 3 | 1 | 1.5 | 4.7 | 1 | 1 | 0.5 | 0.2 | 0.5 | 0.1 | — | 0.86 | 0.75 |
| Ceramming Schedule† | C | C | C | C | C | C | B | B | C | C | C | C | B | B | C | A | A |
| CTE@700° C. ($\times 10^{-7} K^{-1}$) | 0.4 | — | | -0.2 | -0.8 | 0.3 | | | 0.2 | 0.6 | 0.8 | 0.7 | -1.3 | -1.3 | 0 | ~8 | ~8 |
| Crystalline phases‡ | BQ | BS | BQ | BQ | BQ | BQ | BS | BS | BQ | BQ | BQ | BQ | BQ | BQ | BQ | BQ | BQ |
| Color L* | 0 | — | 58.8 | 0 | 66.5 | 52.2 | | | 93.7 | 82 | 88.6 | 93.8 | 51.5 | 93.3 | 94.8 | | |
| (CIE 1976) A* | 0 | | 20 | 0 | 13.8 | 20 | | | 2 | 7.7 | 5.4 | 1.7 | 14.9 | 1 | -1.1 | | |
| b* | 0 | | 38 | 0 | 29.9 | 46.9 | | | 1.9 | 16.3 | 7.9 | 3.3 | 35.7 | 3.3 | 4.7 | | |
| Appearance§ | BK | GO | CI | BK | CS | CD | RT | LO | RL | BL | RD | RL | BR | RLG | YS | BK | BK |
| $\lambda_{10}$ (nm)** | 1550 | — | 490 | 1090 | 410 | 520 | — | — | 350 | 370 | 360 | 360 | 500 | 320 | 370 | >800 | >800 |
| T @ 2600 nm†† | 50 | — | >85 | 70 | >85 | >85 | — | — | >85 | >85 | >85 | >85 | >85 | >85 | >85 | >85 | >85 |
| T @ 600 nm | <1 | — | 40 | <1 | 50 | 30 | — | — | >85 | 70 | 80 | >85 | 30 | >85 | >85 | <1 | <1 |
| T @ 400 nm | <1 | — | 5 | <1 | 5 | <1 | — | — | 80 | 40 | 65 | 75 | 5 | 70 | 70 | <1 | <1 |

*Example No. 15 is a comparative example in that its composition does not contain bismuth.
†The ceramming schedules used are as follows: Schedule A: rapid heating to 780° C.; held for 2 hours at 780° C.; rapid heating to 890° C., then held for 2 hours at 890° C. Schedule B: heated to 650° C. at 30 K/minute; then heated to 820° C. in 40 minutes; then held at 820° C. for 10 minutes; then heated to 900° C. at 10° C./minute; then held at 900° C. for 15 minutes; followed by cooling. Schedule C: 660–820° C.: 42 minutes; followed by 820–900° C.: 28 minutes; followed by cooling.
‡Codes for the crystalline phases: BQ: β-quartz solid solution; BS: β-spodumene solid solution.
§The color codes are as follows: BK: Black; GO: Grey Opaque; CI: Intense Chestnut; CS: Shady Chestnut; CD: Dark Chestnut; RT: Translucent Reddish; LO: Opaque Lilac; BL: Light Brown; RD: rose; RL: Light Rose; BR: Brown; RLG: Light Greyish Rose; YS: Yellowish.
**The parameter $\lambda_{10}$ is defined as the shortest wavelength longer than 300 nm at which transmission is about 10% at a thickness of 3.0 mm, without surface reflection loss correction.
††Transmission (T) was measured through a flat plate having a thickness of 3.0 mm, without surface reflection loss correction.

What is claimed is:

1. A glass-ceramic material comprising bismuth as a coloring species in the visible range, wherein the glass-ceramic material has a composition, expressed in terms of percentage by weight of the total composition on the basis of oxides, consisting essentially of: $SiO_2$: 60-70%, $Al_2O_3$: 17-22%, $Li_2O$: 2-5%, MgO: 0-3%, BaO: 0-2%, CaO: 0-2%, SrO: 0-2%, ZnO: 0-4%, $TiO_2$: 0-5%, $ZrO_2$: 0-5%, $TiO_2+ZrO_2$: 2.5-6%, $SnO_2$: 0-3%, $Bi_2O_3$: 0.1-10%, and $CeO_2+WO_3+Nb_2O_5+MoO_3$: 0-1%.

2. A glass-ceramic material according to claim 1 having a total transmission in the visible range, measured through a flat plate sample at a thickness of 4 mm, of less than 10%.

3. A glass-ceramic material according to claim 1 having a transmission at 2600 nm, measured through a flat plate sample at a thickness of 4 mm, of higher than 50%.

4. A glass-ceramic material according to claim 1, having a CTE of from $-10\times 10^{-7}/K$ to $25\times 10^{-7}/K$.

5. A glass-ceramic material according to claim 1, comprising at least 0.2% by weight of $Bi_2O_3$.

6. A glass-ceramic material according to claim 1, comprising at least 0.5% by weight of $Bi_2O_3$ and essentially free of tin.

7. A glass-ceramic material according to claim 1, comprising at least one component selected from the group consisting of $SnO_2$, $TiO_2$, $CeO_2$, $WO_3$, $Nb_2O_5$, and $MoO_3$.

8. A glass-ceramic material according to claim 5, comprising at least 0.1% by weight of $SnO_2$.

9. A glass-ceramic material according to claim 1, having a composition, expressed in terms of percentage by weight of the total composition on the basis of oxides, consisting essentially of:
$SiO_2$: 60-70%; $Al_2O_3$: 17-22%; $Li_2O$: 2-5%; MgO: 0-3%; CaO: 0-2%; SrO: 0-2%; BaO: 0-2%; ZnO: 0-4%; $TiO_2$: 0-5%; $ZrO_2$: 0-5%; $TiO_2+ZrO_2$: 2.5-6%; $SnO_2$: 0.2-1.0%; $Bi_2O_3$: 0.1-10%; $CeO_2+WO_3+Nb_2O_5+MoO_3$: 0-1%; and $Fe_2O_3$: <0.2%.

10. A glass-ceramic material according to claim 1, having a composition essentially free of $SnO_2$, expressed in terms of percentage by weight of the total composition on the basis of oxides, consisting essentially of:
$SiO_2$: 60-70%; $Al_2O_3$: 17-22%; $Li_2O$: 2-5%; MgO: 0-3%; BaO: 0-2%; CaO: 0-2%; SrO: 0-2%; ZnO: 0-4%; $TiO_2$: 0-5%; $ZrO_2$: 0-5%; $TiO_2+ZrO_2$: 2.5-6%; $Bi_2O_3$: 0.5-6%; $CeO_2+WO_3+Nb_2O_5+MoO_3$: 0-1%; and $Fe_2O_3$: <0.2%.

11. A glass-ceramic material according to claim 1, comprising β-quartz solid solution as a predominant crystalline phase.

12. A glass-ceramic material according to claim 1, comprising β-spodumene solid solution as predominant crystalline phase.

13. A glass-ceramic material according to claim 1, which is essentially free of vanadium.

14. A glass-ceramic material according to claim 1, which is essentially free of $As_2O_3$ and $Sb_2O_3$.

15. A glass-ceramic material according to claim 1, comprising reduced bismuth.

16. An article comprising the glass-ceramic material according to claim 1.

17. An article according to claim 16, which is selected from: a cooktop plate, a stove window; a microwave oven plate; a fireplace window, and an optical filter.

18. A process for making a glass-ceramic article, comprising the following steps:
(A) providing a precursor glass material having a composition, expressed in terms of percentage by weight of the total composition on the basis of oxides, consisting essentially of: $SiO_2$: 60-70%; $Al_2O_3$: 17-22%, $Li_2O$: 2-5%, MgO: 0-3%, CaO: 0-2%, SrO: 0-2%, BaO: 0-2%, ZnO: 0-4%, $TiO_2$: 0-5%, $ZrO_2$: 0-5%, $TiO_2+ZrO_2$: 2.5-6$SnO_2$: 0-3%, $Bi_2O_3$: 0.1-10%, $CeO_2+WO_3+Nb_2O_5+MoO_3$: 0-1%;
(B) forming the precursor glass material into a glass article having desired shape;
(C) subjecting the glass article formed in step (B) to nucleating heat treatment to form crystal nuclei inside the glass article; and
(D) subjecting the glass article treated in step (C) to crystal growing heat treatment to grow crystals in desirable phases in the glass article.

19. A process according to claim 18, wherein in step (A), the precursor glass material has a composition, expressed in terms of percentage by weight of the total composition on the basis of oxides, consisting essentially of: $SiO_2$: 60-70%; $Al_2O_3$: 17-22%; $Li_2O$: 2-5%; MgO: 0-3%; BaO: 0-2%; CaO: 0-2%; SrO: 0-2%; ZnO: 0-4%; $TiO_2$: 0-5%; $ZrO_2$: 0-5%; $TiO_2+ZrO_2$: 2.5-6%; $SnO_2$: 0.3-1.5%; $Bi_2O_3$: 0.1-10%; and $CeO_2+WO_3+Nb_2O_5+MoO_3$: 0-1%; and $Fe_2O_3$: less than 0.2%.

20. A process according to claim 18, wherein in step (A), the precursor glass material has a composition, expressed in terms of percentage by weight of the total composition on the basis of oxides, consisting essentially of: $SiO_2$: 60-70%; $Al_2O_3$: 17-22%; $Li_2O$: 2-5%; MgO: 0-3%; CaO: 0-2%; SrO: 0-2%; BaO: 0-2%; ZnO: 0-4%; $TiO_2$: 0-5%; $ZrO_2$: 0-5%; $TiO_2+ZrO_2$: 2.5-6%; and $CeO_2+WO_3+Nb_2O_5+MoO_3$: 0-1%, and the composition is essentially free of $SnO_2$.

21. A process according to claim 18, wherein in step (C), the nucleating heat treatment involves heating the glass article to a temperature from 650 to 850° C.

22. A process according to claim 18, wherein in step (D), the crystal growing heat treatment comprises heating the glass article to a temperature from 800 to 950° C.

23. A process according to claim 18, wherein in step (D), the crystal growing heat treatment comprises heating the glass article to a temperature such that β-quartz solid solution is allowed to form as the predominant crystalline phase.

24. A process according to claim 18, wherein in step (D), the crystal growing heat treatment comprises heating the glass article to a temperature from 850 to 1200° C.

25. A process according to claim 18, wherein in step (D), the crystal growing heat treatment comprises heating the glass article to a temperature such that β-spodumene solid solution forms as the predominant crystalline phase.

26. A process according to claim 18, wherein step (A) comprises the following steps:
(A1) providing starting materials for the glass material; and
(A2) melting the starting materials to form the glass material;
wherein in step (A2), reduction of $Bi_2O_3$ to reduced bismuth is essentially inhibited.

27. A process according to claim 26, wherein in step (A1), an oxidizing agent is included in the starting materials.

* * * * *